United States Patent [19]

Shimomura et al.

[11] Patent Number: 4,914,155

[45] Date of Patent: Apr. 3, 1990

[54] THERMOPLASTIC RESIN COMPOSITION

[75] Inventors: Yozo Shimomura; Kinya Mori; Osamu Kojima, all of Chiba, Japan

[73] Assignee: Chisso Corporation, Japan

[21] Appl. No.: 180,843

[22] Filed: Apr. 12, 1988

[30] Foreign Application Priority Data

Apr. 15, 1987 [JP] Japan .................. 62-92750

[51] Int. Cl.$^4$ .................. C08L 53/00; C08L 25/06
[52] U.S. Cl. .................. 525/89; 525/88; 525/98
[58] Field of Search .................. 525/89, 88

[56] References Cited

U.S. PATENT DOCUMENTS

| | | | |
|---|---|---|---|
| 4,122,131 | 10/1978 | Bussink et al. | 525/89 |
| 4,550,144 | 10/1985 | Chiba et al. | 525/323 |
| 4,687,804 | 8/1987 | Shiraishi et al. | 525/89 |
| 4,737,536 | 4/1988 | Kawase et al. | 525/89 |
| 4,773,203 | 11/1987 | Kawamura et al. | 525/89 |
| 4,775,711 | 10/1988 | Kawamura et al. | 525/89 |

FOREIGN PATENT DOCUMENTS

| | | | |
|---|---|---|---|
| 56-38338 | 4/1981 | Japan . | |
| 2070438 | 3/1987 | Japan | 525/89 |
| 2187779 | 8/1987 | Japan | 525/89 |
| 2003891 | 3/1979 | United Kingdom . | |

Primary Examiner—Wilbert J. Briggs, Sr.
Attorney, Agent, or Firm—Leydig, Voit & Mayer

[57] ABSTRACT

A thermoplastic resin composition comprising:

(A) 20 to 60% by weight of a propylene-ethylene block copolymer obtained by block copolymerizing 70 to 95% by weight, based on the total weight of the block copolymers, of propylene homopolymers obtained by polymerizing propylene at first stage, having a relationship represented by the formula:

$$1.00 \geq P \geq 0.015 \log MFR + 0.955$$

(wherein P is an isotactic pentad ratio of a propylene homopolymer and MFR is a melt flow rate thereof), and 30 to 5% by weight, based on the total weight of the block copolymer, of ethylene or ethylene and propylene at one or more stages, the ethylene content being 3 to 12% by weight based on the total weight of the block copolymers;

(B) 60 to 20% by weight of a styrene homopolymer; and (C) 5 to 30% by weight of a styrene-ethylene.butylene-styrene block copolymer or a styrene-ethylene.propylene block copolymer, the total of (A), (B) and (C) being 100% by weight.

4 Claims, 1 Drawing Sheet

THERMOPLASTIC RESIN COMPOSITION

FIELD OF THE INVENTION

The present invention relates to a thermoplastic resin composition. More particularly, it is concerned with a thermoplastic resin composition which, when molded, provides a molding having excellent impact resistance, stiffness, appearance, shape retention (dimensional accuracy and shrinkage) and fabrication property.

BACKGROUND OF THE INVENTION

Polypropylene resins such as a propylene homopolymer, a propylene-ethylene block copolymer, a propylene-ethylene random copolymer and the like are widely used as general-purpose thermoplastic resins in various molding fields such as film molding, injection molding, extrusion molding, blow molding, extrusion stretching molding, sheet molding and the like, because they are easily available and satisfy, to a certain extent, physical properties required by the market.

In recent years, plastics have been increasingly used in production of industrial parts. For example, it is reported that the amount of plastics used as car parts per one car reaches about 8% by weight based on the weight of the car. In application of plastics as industrial parts, physical properties required for the plastics vary greatly depending on the type of part and the purpose of use. Car parts are usually divided into three groups: functional parts, exterior parts and interior parts. When plastics are used as functional parts, it is required for them to have excellent properties such as stiffness, heat resistance, creep properties and the like. For exterior parts are required to have excellent properties such as impact resistance, appearance, fabrication properties, shape retention, weather resistance and the like. That is, properties required for plastics vary depending on the purpose of use. It is required for interior parts to have properties which are well balanced in properties required for both the functional and exterior parts, taking into account the conditions and state of use. For example, impact resistance required for functional parts is sufficient to be relatively low while on the other hand, the impact resistance required for exterior parts such as a bumper should be high at a low temperature range (0° C. to −50° C.) so that a driver can be protected in a crash. Impact resistance required for interior parts is not so high as required for exterior parts, because the interior parts are used inside the car. That is, it is sufficient for the interior parts to have high impact resistance over a temperature range of up to about −20° C.

With regard to stiffness, polypropylene resins have an average value among thermoplastic resins, such as polyvinyl chloride, polyethylene, rubber-modified polystyrene, an acrylonitrile-butadiene-styrene copolymer (hereinafter referred to as an "ABS resin"), acrylonitrile-styrene copolymer and the like, which have heretofore been used in large amounts as industrial parts. Although polypropylene resins are comparable with ABS resins having high stiffness in respect of stiffness at room temperature, at a high temperature range of about 80° C. at which parts are often used, a reduction in stiffness (high temperature softening) of the polypropylene resins is larger than that of styrene-based resins such as the ABS resins. As a result, the polypropylene resins have problems in that thermal creep, permanent deformation and heat shrinkage of parts made of the polypropylene resins tend to occur. That is, even in a talc-reinforced polypropylene resin, the flexural modulus at room temperature of which is equal to that of an ABS resin, the flexural modulus at 80° C. drops to about one-half of the ABS resin. Moreover, moldings of the polypropylene resins are inferior to those of the ABS resins in appearance, shape retention and fabrication properties. To improve impact resistance of polypropylene resins, a method has been known in which an elastomer such as an ethylene-propylene copolymer rubber (hereinafter referred to as "EPR") and a styrene-butadiene copolymer (hereinafter referred to as "SBR"), or a propylene-ethylene block copolymer is compounded to a propylene homopolymer. A method has also been employed in which among polypropylene resins, a propylene-ethylene block copolymer having excellent impact resistance is used.

In order to improve stiffness and shape retention of molded articles compositions have been developed in which an inorganic filler such as glass fibers, talc and the like is compounded with a propylene homopolymer, or propylene-ethylene copolymers such as a propylene-ethylene block copolymer and a propylene-ethylene random copolymer.

Further, in order to improve stiffness and fabrication properties, many attempts to mix the above-described styrene-based resins with a polypropylene resin have been made. In addition, compositions have been proposed in which to improve compatibility, impact resistance and stiffness of mixtures of polyolefin resins such as a polypropylene-based resin, a polyethylene resin, a poly-4-methylpentene-1 and the like, and styrene-based resins, a block copolymer resulting from a specific hydrogenated styrene-conjugate diene block copolymer is added to the mixtures.

For example, Japanese patent application (OPI) No. 53159/79 (the term "OPI" as used herein means a "published unexamined Japanese patent application") discloses a composition in which styrene-ethylene-butylene-styrene block copolymer is preliminarily mixed with a polyolefin-based resin and the resulting mixture is mixed with a styrene-based resin.

Japanese Patent Application (OPI) No. 38338/81 discloses a composition in which a hydrogenated block copolymer such as a styrene-ethylene-butylene-styrene block copolymer is compounded with a resin mixture of a polyolefin-based resin and a styrene-based resin.

In a composition comprising a propylene homopolymer and EPR or a propylene-ethylene block copolymer compounded thereto, a molded article made of the composition is improved in impact resistance, but a problem such as a serious reduction in stiffness occurs and furthermore shape retention (dimensional accuracy and shrinkage) and fabrication properties are not improved.

In a composition in which among polypropylene-based resins, a propylene-ethylene block copolymer having relatively excellent impact resistance is used, a molded article made of the composition is improved to a certain extent in impact resistance, but its stiffness and appearance (luster of the surface of the molding) are seriously reduced and furthermore shape retention (dimensional accuracy and shrinkage) and fabrication properties are not improved at all.

In a composition in which an inorganic filler is compounded with a propylene homopolymer or a propylene-ethylene copolymer, a molded article made of the composition is improved in stiffness, but its impact resistance and appearance (surface luster) are reduced. The percentage of shrinkage of the molded article is improved, but anisotropy occurs, that is, deformation of molded article such as twisting and warpage of the molded article are caused and the shape is undesirably deformed. Moreover, fabrication properties are not improved.

In a composition of a polypropylene-based resin and a styrene-based resin, since compatibility of the two resins are poor, even if they are melt mixed merely mechanically, the resulting mixture is seemingly uniform, but it is brittle and its impact resistance is seriously decreased as compared with the original polypropylene-based resin. That is, a molded article having only a very low practical value can be obtained, and the molded article cannot be used as an industrial part as described above. With regard to fabrication properties, when the composition is molded, phillite-like peeling is developed on the surface of the molded article; that is, no satisfactory fabrication properties have been obtained.

In the composition comprising a polyolefin-based resin and a styrene-ethylene-butylene-styrene block copolymer as disclosed in Japanese patent application (OPI) No. 53159/79, the operation procedure becomes complicated because preliminary mixing is required, and a molded article made of the composition has a poor impact resistance and, therefore, the composition is unsuitable for use in production of industrial parts as described above.

A molded article made of the composition comprising a polyolefin-based resin and a styrene-based resin as described in Japanese patent application (OPI) No. 38338/81 is not well balanced in impact resistance and stiffness and cannot be used at all in production of industrial parts as described above. For example, when a polyethylene resin is used as polyolefin-based resins, a molded article made of the resulting composition is decreased in stiffness, particularly stiffness at a high temperature range. In the case of the above-described composition in which a propylene homopolymer is used as the polyolefin-based resin, impact strength is seriously decreased although stiffness is effectively improved. In the case of the above-described composition in which the conventional propylene-ethylene block copolymer is used in place of the propylene homopolymer, stiffness at a high temperature range is low although impact resistance is effectively improved. In the case of the above-described composition in which an acrylonitrile-styrene copolymer is used as the styrene-based resin, impact resistance is seriously decreased although stiffness is effectively improved.

As a result of investigations to overcome the above problems of polypropylene-based resin compositions, it has been found that a composition obtained by compounding a specific amount of a styrene homopolymer and a styrene-ethylene-butylene-styrene block copolymer (a copolymer consisting of polystyrene block, ethylene-butylene random copolymer block and polystyrene block) or a styrene-ethylene-propylene block copolymer (a copolymer consisting of polystyrene block and ethylene-propylene random copolymer block) to a specific propylene-ethylene block copolymer, when molded, provides a molded article which has excellent impact resistance, stiffness, appearance, shape retention and fabrication properties. The present invention has been attained on the basis of this finding.

SUMMARY OF THE INVENTION

Accordingly, an object of the present invention is to provide a thermoplastic resin composition which can produce a molded article having excellent stiffness at a high temperature range, impact resistance, appearance, shape retention and fabrication properties.

The present invention provides a thermoplastic resin composition comprising:
(A) 20 to 60% by weight of a propylene-ethylene block copolymer obtained by block copolymerizing 70 to 95% by weight, based on the total weight of the block copolymers, of propylene homopolymers obtained by polymerizing propylene at first stage, having a relationship represented by the formula:

$$1.00 \geq P \geq 0.015 \log MFR + 0.955$$

(wherein P is an isotactic pentad ratio of a propylene homopolymer and MFR is a melt flow rate thereof), and 30 to 5% by weight, based on the total weight of the block copolymer, of ethylene or ethylene and propylene at one or more stages, the ethylene content being 3 to 12% by weight based on the total weight of the block copolymers;
(B) 60 to 20% by weight of a styrene homopolymer; and
(C) 5 to 30% by weight of a styrene-ethylene-butylene-styrene block copolymer or a styrene-ethylene-propylene block copolymer, the total of (A), (B) and (C) being 100% by weight.

BRIEF DESCRIPTION OF THE INVENTION

FIG. 1 shows a ribbed plate test piece for measurement of amount of distortion, wherein C indicates the rib, H indicates the height of the rib, l indicates the length in the longitudinal direction, W indicates the width, $t_1$ indicates the thickness of the plate, and $t_2$ indicates the thickness of the rib.

Typical measurements are l=150 mm, W=50 mm, H=10 mm, $t_1$=3 mm, $t_2$=2 mm.

FIG. 2 is a cross-sectional view taken along Line D of the ribbed plate test piece of FIG. 1, wherein A indicates a flat portion opposite to the ribbed surface, and B indicates a flat portion of the ribbed surface. W and H have the same meanings as in FIG. 1.

DETAILED DESCRIPTION OF THE INVENTION

Figure 1:
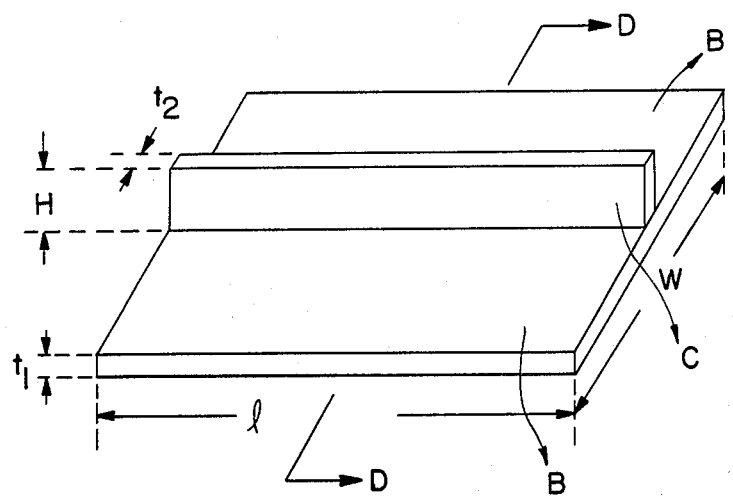
Figure 2:
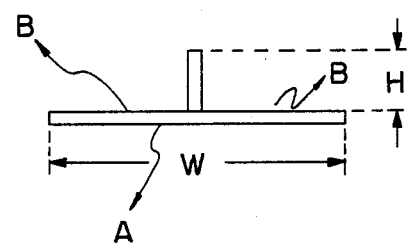

The propylene-ethylene block copolymer which can be used in the present invention is a propylene-ethylene block copolymer having a specific composition and physical properties (hereinafter referred to as a "specific propylene-ethylene block copolymer").

The conventional propylene-ethylene block copolymer is produced by a polymerization method comprising two or more polymerization steps including a step of producing a propylene homopolymer portion and a step of producing an ethylene homopolymer portion or an ethylene-propylene copolymer portion, and has a defect in that the stiffness is inferior to a propylene homopolymer although it is superior in impact resistance thereto.

The specific propylene-ethylene block copolymer which can be used in the present invention is a certain kind of a high stiffness polypropylene such that the isotactic pentad ratio (P) of the propylene homopolymer portion constituting 70 to 95% by weight of the total block copolymer has the following relationship:

$$1.00 \geq P \geq 0.015 \log MFR + 0.955$$

and the ethylene content of the remaining ethylene-propylene copolymer is limited to 3 to 12% by weight, preferably 4 to 10% by weight based on the total weight of the block copolymer.

The specific propylene-ethylene block copolymer can be produced by, for example, the method described in Japanese patent application (OPI) No. 201816/83. That is, the specific copolymer can be obtained by the polymerization method performed in the presence of a catalyst comprising: a solid product (I) obtained by reacting an organoaluminum compound represented by the formula:

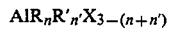

(wherein R and R' are each a hydrocarbon group such as an alkyl group, an aryl group, an alkaryl group and a cycloalkyl group, or an alkoxy group, X is a halogen atom such as fluorine, chlorine, bromine and iodine, and n and n' are each a number satisfying the relationship: $0 < n+n' \leq 3$), e.g., diethylaluminum chloride and triethylaluminum, or a reaction product of the above organoaluminum compound and an electron donor such as diisoamyl ether, with titanium tetrachloride, and then reacting the resulting solid product with an electron donor such as diisoamyl ether and an electron acceptor such as titanium tetrachloride; an organoaluminum compound (II) represented by the above-described formula; and an aromatic carboxylic acid ester (III), such as methyl p-toluate, butyl p-toluate and methyl p-anisate, the molar ratio of the aromatic carboxylic acid ester (III) to the solid product (I) ((III)/(I)) being 0.1/1 to 10.0/1, and the molar ratio of the organoaluminum compound (II) to the solid product (I) ((II)/(I)) being 0.1/1 to 100/1, (i) 70 to 95% by weight, based on the total weight of block copolymer, of propylene is polymerized, and then (ii) 30 to 5% by weight, based on the total weight of block co-polymer, of ethylene or ethylene and propylene is polymerized so that the ethylene content is 3 to 12% by weight based on the total weight of block copolymer.

The specific propylene-ethylene block copolymer is superior in various physical properties to the conventional propylene homopolymers and propylene-ethylene block copolymers. The amount of the specific propylene-ethylene block copolymer compounded is 20 to 60% by weight and preferably 30 to 50% by weight, based on the weight of the composition. If the amount of the specific propylene-ethylene block copolymer compounded is less than 20% by weight, the resulting composition cannot provide a molded article having sufficiently improved impact resistance. On the other hand, if the amount thereof is more than 60% by weight, stiffness, shape retention and fabrication properties are undesirably reduced.

The styrene homopolymer which can be used in the present invention is the general purpose polymer produced by the conventional method, and can be appropriately selected from commercially available products in the name of polystyrene. For example, STYRON 666, 679 and 605 (registered trade marks, produced by Asahi Chemical Industry Co., Ltd.), Dick Styrene CR-2500 and CR-3500 (registered trade marks, produced by DAINIPPON INK AND CHEMICALS, INC.) and the like.

The amount of the styrene homopolymer compounded is 60 to 20% by weight and preferably 30 to 50% by weight, based on the total weight of the composition. If the amount of the styrene homopolymer compounded is less than 20% by weight, the resulting composition cannot provide molded article having sufficiently improved stiffness, shape retention and fabrication properties. On the other hand, if the amount thereof is more than 60% by weight, impact resistance is undesirably decreased.

The styrene-ethylene-butylene-styrene block copolymer (hereinafter referred to as "SEBS") and styrene-ethylene propylene block copolymer (hereinafter referred to as "SEP") which can be used in the present invention are rubber-like substances produced by the conventional method (e.g., the method described in Japanese Patent Publication No. 57463/85). Examples of those SEBS and SEP include commercially available products such as Kraton G1650, G1652, G1657 and G1701 (registered trade mark, produced by Shell Chemical Co., Ltd.) and the like.

The amount of SEBS and SEP compounded is 5 to 30% by weight and preferably 10 to 25% by weight, based on the total weight of the composition. If the amount of SEBS and SEP compounded is less than 5% by weight, the resulting composition cannot provide a molded article having sufficiently improved impact resistance. Furthermore, the layer separation phenomena such as phillite-like peeling are observed on the surface of molded article and its appearance is deteriorated. On the other hand, if the amount thereof is more than 30% by weight, not only mechanical strength but also stiffness and fabrication properties are undesirably reduced.

In the composition of the present invention, if necessary, various additives which are commonly used in the conventional polypropylene resin, such as a nucleating agent, an antioxidant, a heat stabilizer, an antistatic agent, an ultraviolet absorbing agent, a metal deactivator (copper deactivator), a colorant and the like can be used alone or in any combinations thereof. In addition, other components such as an inorganic filler (such as talc, calcium carbonate or mica), a flame retardant, an auxiliary flame retardant, and the like can be added to the composition of the present invention within the range that does not markedly deteriorate the objects of the present invention.

The composition of the present invention can be prepared by introducing predetermined amounts of components into a mixing apparatus such as a Henschel mixer (trade mark) or a super mixer, mixing them for several minutes, e.g., 3 minutes, melt kneading the resulting mixture in a roll, a Banbury mixer, a cokneader, a single screw or twin-screw extruder or the like at a temperature of 180° to 300° C. and preferably 200° to 280° C., and then pelletizing. The composition of the present invention as prepared above is used in the production of molded articles by various molding techniques such as injection molding, extrusion molding and blow molding, depending on the purpose for which the article is to be used.

Molded articles produced from the composition of the present invention are well balanced in impact resistance, stiffness, appearance, shape retention and fabrication properties.

In particular, the molded articles produced from the composition of the present invention have far higher stiffness at a high temperature range, impact resistance and luster than those produced from the conventional polypropylene-based resin compositions. Furthermore, the molded articles produced from the composition of the present invention have good shape retention and dimensional accuracy that could not be realized by using polypropylene-based resin compositions, and also have excellent fabrication properties.

Therefore, the composition of the present invention is suitable for use in various applications, particularly in applications where impact resistance, stiffness, appearance, shape retention and fabrication properties are strongly required: for example, in production of home electric appliance parts, wrapping materials, containers, car parts and the like. The composition of the present invention, when molded, provides molded articles having high stiffness at a high temperature range. Thus, in connection with home electric appliance parts, the composition of the present invention is suitable for use in production of an iron body, an electric tool body and the like, and in connection with car parts, the composition of the present invention is suitable for use in production of pillars, trim, rear quarter panels and the like. Further, since the composition of the present invention provides molded article having good shape retention and appearance, the composition of the present invention is suitable for use in production of a cleaner body, a telephone receiver, a top panel of a washing machine, and the like as home electric appliance parts, and also in production of all interiors, a tail lamp rim, and the like, as car parts. Furthermore, since the composition of the present invention provides molded articles having excellent fabrication properties, the composition is suitable for use in production of various wrapping films, home electric appliance parts such as a sheet for a VTR cassette case, a TV front cover, a front panel of the inside unit of an air conditioner, and the like, and car interiors such as a console box, a door trim and the like.

The present invention is described in greater detail by reference to the following examples and comparative examples, but it should be understood that the present invention is not limited to those examples and comparative examples.

Evaluation methods employed in the examples and comparative examples are as follows:

(1) Stiffness

Stiffness was evaluated by measuring a flexural modulus at 80° C. according to JIS K7203.

(2) Impact Resistance

Impact resistance was evaluated by the following two methods:
(a) Izod Impact Strength
Izod impact strength was measured at both 23° C. and −20° C. according to JIS K7110.
(b) Dart Impact Resistance
A plate having a length of 50 mm, a width of 50 mm and a thickness of 2 mm was molded by injection molding and was used as a test piece. A dart impact head having a round top having a diameter of 6.35 mm and a weight of 1,000 g was dropped on the plate from a height of 1 m at both 23° C. and −20° C., and the state of break was examined.

O: The test piece was not broken.
X: The test piece wa broken.

(3) Appearance

The appearance was evaluated by the following two methods.
(a) Measurement of Luster
Luster was measured at an incident angle of 60° according to JIS Z8741.
(b) Evaluation with the Eye
A plate having a length of 50 mm, a width of 50 mm and a thickness of 2 mm was molded by injection molding and was used as a test piece. The appearance of the test piece was visually evaluated according to the following criteria.
O: Good appearance
X: The layer separation phenomena such as phillite-like peeling was observed on the surface of the test piece.

(4) Shape Retention

The shape retention was evaluated by the following two methods.
(a) Measurement of Shrinkage
A plate having a length of 400 mm, a width of 80 mm and a thickness of 3 mm was injection molded and used as a test piece. The test piece was allowed to stand at 23° C. for 48 hours, and the length in the longitudinal direction was measured. The value measured was divided by 400 mm and indicated in percentage.
(b) Measurement of Amount of Distortion
A ribbed plate as shown in FIG. 1 was injection molded to produce a test piece. This test piece was allowed to stand at 23° C. for 48 hours. Surface A or surface B (ribbed surface) of the test piece was placed in close contact with a smooth plate, and one end in the longitudinal direction of the test piece was fixed with a finger. The rising distance between the end point opposite to the fixed end point and the smooth plate was measured and indicated as an amount of distortion.

(5) Fabrication Properties

Evaluation of fabrication properties was conducted by an adhesion test of a molded article.

A plate having a length of 30 mm, a width of 10 mm and a thickness of 2 mm was injection molded to produce a test piece. Two test pieces were used, and ⅓ of the surface area of each test piece was coated with an adhesive. These test pieces were superposed in such a manner that the adhesive coated areas were in contact with each other, and then pressed at a temperature of 23° C. for 1 minute with a finger. The bonded test piece assembly was subjected to a tensile shear test (temperature 23° C.) at a pulling speed of 20 mm/min using a tensile test machine to determine a strength at break. In this test, a cyanoacrylate-based adhesive, Aron Alpha 201 (produced by Toagosei Chemical Industry Co., Ltd. was used as the adhesive.

EXAMPLES 1 AND 2, AND COMPARATIVE EXAMPLES 1 TO 7

In Examples 1 and 2, a propylene-ethylene block copolymer formed from a propylene homopolymer having a melt flow rate (MFR) of 30 g/10 min and an isotactic pentad ratio (P) of 0.98 at a first stage and an ethylene content of 8.5% by weight was used as the specific propylene-ethylene block copolymer: STYRON 679 (registered trade mark, produced by Asahi Chemical Industry Co., Ltd., melt flow rate (MFR): 22 g/10 min.), or STYRON 605 (registered trade mark, produced by Asahi Chemical Industry Co., Ltd., melt flow rate (MFR): 2 g/10 min) was used as the styrene homopolymer: and Krayton G-1652 (registered trade mark, produced by Shell Chemical Co., Ltd.) was used as the styrene-ethylene-butylene-styrene block copolymer. These were compounded in the proportions shown in Table 1 below, mixed in a Henschel mixer trade mark for 5 minutes, and then melt kneaded and extruded at a melt kneading temperature of 220° C. using a single screw extruder to obtain a composition in the form of pellet.

In Comparative Example 1, pellets of the conventional propylene-ethylene block copolymer formed from a propylene homopolymer having a melt flow rate (MFR) of 30 g/10 min and an isotactic pentad ratio (P) of 0.93 at a first stage and an ethylene content of 8.5% by weight were used. In Comparative Example 2, the same conventional propylene-ethylene block copolymer (1) and Krayton G-1652 as used in Example 1 were used. In Comparative Example 7, the same specific propylene-ethylene block copolymer and Krayton G-1652 as used in Examples 1 and 2, and STYLAC AS769 (registered trade mark, produced by Asahi Chemical Industry Co., Ltd.) as the acrylonitrile-styrene copolymer were used. In Comparative Examples 2 to 7, the above components were compounded in the proportions shown in Table 1 below, and mixed and melt kneaded and extruded in the same manner as in Examples 1 and 2 to obtain pellets.

The pellets obtained in Examples 1 and 2, and Comparative Examples 2 to 7, and the pellets of Comparative Example 1 were injection molded at a resin temperature of 250° C. into a predetermined shape to obtain a test piece. The test pieces thus obtained were evaluated for the flexural modulus, Izod impact strength, dart impact test, luster, visual determination of appearance, percentage of shrinkage, amount of distortion, and adhesion strength. The results obtained are shown in Table 1 below.

TABLE 1

|  | Example | | Comparative Example | | | | | | |
|---|---|---|---|---|---|---|---|---|---|
|  | 1 | 2 | 1 | 2 | 3 | 4 | 5 | 6 | 7 |
| Specific Propylene-Ethylene Block Copolymer (wt %) | 30 | 30 | 0 | 0 | 0 | 0 | 0 | 0 | 30 |
| Conventional Propylene-Ethylene Block Copolymer (wt %) | 0 | 0 | 100 | 80 | 0 | 0 | 0 | 30 | 0 |
| Propylene Homopolymer (wt %) | 0 | 0 | 0 | 0 | 50 | 30 | 0 | 0 | 0 |
| Polyethylene resin (wt %) | 0 | 0 | 0 | 0 | 0 | 0 | 30 | 0 | 0 |
| Styrene Homopolymer (1) (wt %) | 50 | 0 | 0 | 0 | 50 | 50 | 50 | 50 | 0 |
| Styrene Homopolymer (2) (wt %) | 0 | 50 | 0 | 0 | 0 | 0 | 0 | 0 | 0 |
| Acrylonitrile-Styrene Copolymer (wt %) | 0 | 0 | 0 | 0 | 0 | 0 | 0 | 0 | 50 |
| Styrene-Ethylene-Butylene-Styrene Block Copolymer (wt %) | 20 | 20 | 0 | 0 | 0 | 20 | 20 | 20 | 20 |
| Talc (wt %) | 0 | 0 | 0 | 20 | 0 | 0 | 0 | 0 | 0 |
| Flexural Modulus at 80° C. (kgf/cm$^2$) | 8,300 | 7,500 | 2,800 | 6,200 | 11,000 | 8,200 | 3,600 | 6,000 | 10,000 |
| Izod Impact Strength 23° C. (kg-cm/cm) | 35 | 22 | 7.0 | 3.4 | 3.0 | 10 | 29 | 37 | 5.5 |
| Izod Impact Strength −20° C. (kg-cm/cm) | 12 | 10 | 4.1 | 2.0 | 1.5 | 3.5 | 7.6 | 12 | 3.0 |
| Dart Impact Test 23° C. (−) |  |  |  | X | X | X |  |  | X |
| Dart Impact Test −20° C. (−) |  |  |  | X | X | X | X |  | X |
| Luster (%) | 96 | 96 | 75 | 65 | 80 | 96 | 90 | 94 | 93 |
| Visual Determination of Appearance |  |  |  |  | X |  |  |  |  |
| Shrinkage (%) | 0.6 | 0.6 | 1.7 | 1.3 | 0.6 | 0.6 | 1.0 | 0.6 | 0.7 |
| Amount of Distortion (mm) | 0.5 | 0.6 | 2.3 | 3.0 | 0.6 | 0.5 | 0.7 | 0.5 | 0.7 |
| Adhesion Strength (kg/cm$^2$) | 24 | 20 | 2.8 | 3.4 | 17 | 22 | 19 | 21 | 20 | same conventional propylene-ethylene block copolymer as used in Comparative Example 1 and talc having an average particle diameter of 2 μm were used. In Comparative Example 3, a propylene homopolymer having a melt flow rate (MFR) of 10 g/10 min and the same styrene homopolymer as used in Example 1, STYRON 679 (registered trade mark, produced by Asahi Chemical Industry Co., Ltd.), were used. In Comparative Example 4, the same propylene homopolymer as used in Comparative Example 3 and the same styrene-ethylene-butylene-styrene block copolymer as used in Examples 1 and 2, Krayton G-1652 (registered trade mark, produced by Shell Chemical Co., Ltd.), were used. In Comparative Example 5, an ethylene homopolymer having a melt index of 5 and a density of 0.964 g/cm$^3$ was used as the polyethylene resin, and the same styrene homopolymer (1) and Krayton G-1652 (registered trade mark) as the styrene-ethylene-butylene-styrene block copolymer, as used in Example 1 were used. In Comparative Example 6, the same conventional propylene-ethylene block copolymer as used in Comparative Examples 1 and 2, and the same styrene homopolymer (1) and Krayton G-1652 as used in Example 1 were used.

EXAMPLES 3 TO 5, AND COMPARATIVE EXAMPLES 8 TO 13

The same propylene-ethylene block copolymer as used in Examples 1 and 2 was used as the specific propylene-ethylene block copolymer: the same STYRON 679 as used in Example 1 was used as the styrene homopolymer: and the same Krayton G1652 as used in Examples 1 and 2 was used as the styrene-ethylene-butylene-styrene block copolymer, or Krayton G1701 was used as the styrene-ethylene-propylene block copolymer. These were compounded in the proportions shown in Table 2 below, stirred, melt kneaded and extruded in the same manner as in Examples 1 and 2 to obtain the respective compositions in the form of pellets.

The pellets obtained in the Examples and Comparative Examples were molded in the same manner as in Examples 1 and 2 to obtain the respective test pieces. These test pieces were evaluated for the flexural modulus, Izod impact strength, dart impact test, luster, visual determination of appearance, amount of distortion, and adhesion test. The results obtained are shown in Table 2 below.

TABLE 2

|  | Example | | | Comparative Example | | | | | |
| --- | --- | --- | --- | --- | --- | --- | --- | --- | --- |
|  | 3 | 4 | 5 | 8 | 9 | 10 | 11 | 12 | 13 |
| Specific Propylene-Ethylene Block Copolymer (wt %) | 50 | 40 | 35 | 70 | 70 | 20 | 10 | 47 | 30 |
| Styrene Homopolymer (1) (wt %) | 30 | 50 | 50 | 20 | 10 | 70 | 70 | 50 | 30 |
| Styrene-Ethylene·Butylene-Styrene Block Polymer (wt %) | 20 | 10 | 0 | 10 | 20 | 10 | 20 | 3 | 40 |
| Styrene-Ethylene·Propylene Block Copolymer (wt %) | 0 | 0 | 15 | 0 | 0 | 0 | 0 | 0 | 0 |
| Flexural Modulus at 80° C. (kgf/cm$^2$) | 7,000 | 9,300 | 8,500 | 5,100 | 4,000 | 12,000 | 10,000 | 10,000 | 2,500 |
| Izod Impact Strength 23° C. (kg-cm/cm) | 45 | 9.0 | 16 | 24 | 30 | 5.8 | 7.0 | 2.9 | 45 |
| Izod Impact Strength −20° C. (kg-cm/cm) | 17 | 5.0 | 9.0 | 8.0 | 10 | 2.9 | 3.5 | 1.3 | 19 |
| Dart Impact Test 23° C. (−) |  |  |  |  |  | X | X | X |  |
| Dart Impact Test −20° C. (−) |  | X |  | X |  | X | X | X |  |
| Luster (%) | 90 | 96 | 95 | 83 | 85 | 81 | 84 | 82 | 90 |
| Visual Determination of Appearance |  |  |  |  |  | X | X | X |  |
| Shrinkage (%) | 0.8 | 0.6 | 0.6 | 1.3 | 1.4 | 0.6 | 0.7 | 0.6 | 1.1 |
| Amount of Distortion (mm) | 0.7 | 0.5 | 0.6 | 2.8 | 3.1 | 0.6 | 0.5 | 0.5 | 0.8 |
| Adhesion Strength (kg/cm$^2$) | 15 | 23 | 24 | 4.3 | 3.4 | 19 | 21 | 20 | 16 |

While the invention has been described in detail and with reference to specific embodiments thereof, it will be apparent to one skilled in the art that various changes and modifications can be made therein without departing from the spirit and scope thereof.

What is claimed is:

1. A thermoplastic resin composition comprising:
   (A) 20 to 60% by weight of a propylene-ethylene block copolymer obtained by block copolymerizing 70 to 95% by weight, based on the total weight of the block copolymers, of propylene homopolymers obtained by polymerizing propylene at first stage, having a relationship represented by the formula:

$$1.00 \geq P \geq 0.015 \log MFR + 0.955$$

wherein P is an isotactic pentad ratio of a propylene homopolymer and MFR is a melt flow rate thereof, and 30 to 5% by weight, based on the total weight of the block copolymer, of ethylene or ethylene and propylene at one or more stages, the ethylene content being 3 to 12% by weight based on the total weight of the block copolymers;
   (B) 60 to 20% by weight of a styrene homopolymer; and
   (C) 5 to 30% by weight of a styrene-ethylene·butylene-styrene block copolymer or a styrene-ethylene·propylene block copolymer,
the total of (A), (B) and (C) being 100% by weight.

2. The thermoplastic resin composition of claim 1, wherein the amount of the propylene-ethylene block copolymer is 30 to 50% by weight.

3. The thermoplastic resin composition of claim 1, wherein the amount of the styrene homopolymer is 30 to 50% by weight.

4. The thermoplastic resin composition of claim 1, wherein the amount of the styrene-ethylene·butylene-styrene block copolymer or styrene-ethylene·propylene block copolymer is 10 to 25% by weight.

* * * * *